United States Patent [19]

Parrent

[11] 3,711,907
[45] Jan. 23, 1973

[54] ELECTRIC PUMP COMMUTATOR BRUSH HOLDER CONSTRUCTION
[75] Inventor: Russell Parrent, Fairfield, Ill.
[73] Assignee: Airtex Product Div., United Industrial Syndicate, New York, N.Y.
[22] Filed: March 30, 1972
[21] Appl. No.: 239,673

[52] U.S. Cl. ................................................. 310/247
[51] Int. Cl. .......................................... H02k 13/00
[58] Field of Search ...... 310/247, 219, 229, 230, 241, 310/242, 245, 246, 247, 249; 417/422

[56] References Cited

UNITED STATES PATENTS

| | | |
|---|---|---|
| 1,239,056 | 9/1917 | Sparks ................................. 310/247 |
| 1,927,176 | 9/1933 | Langley ............................... 310/241 |
| 2,275,613 | 3/1942 | Cullin .................................. 310/245 |
| 3,513,343 | 5/1970 | Harvey ................................ 310/242 |

*Primary Examiner*—R. Skudy
*Attorney*—Zalkind, Horne & Shuster

[57] ABSTRACT

For a submersible electric fuel pump a commutator brush holder construction is provided of molded body construction comprising a motor end casing and spring holders attached to it. The holders have coil springs which bias respective brushes into commutator engagement and also have contact springs of flat spring leaf material, U-shaped to bracket the coil springs, to provide electrical conduction to connection terminals secured to the spring holders.

10 Claims, 4 Drawing Figures

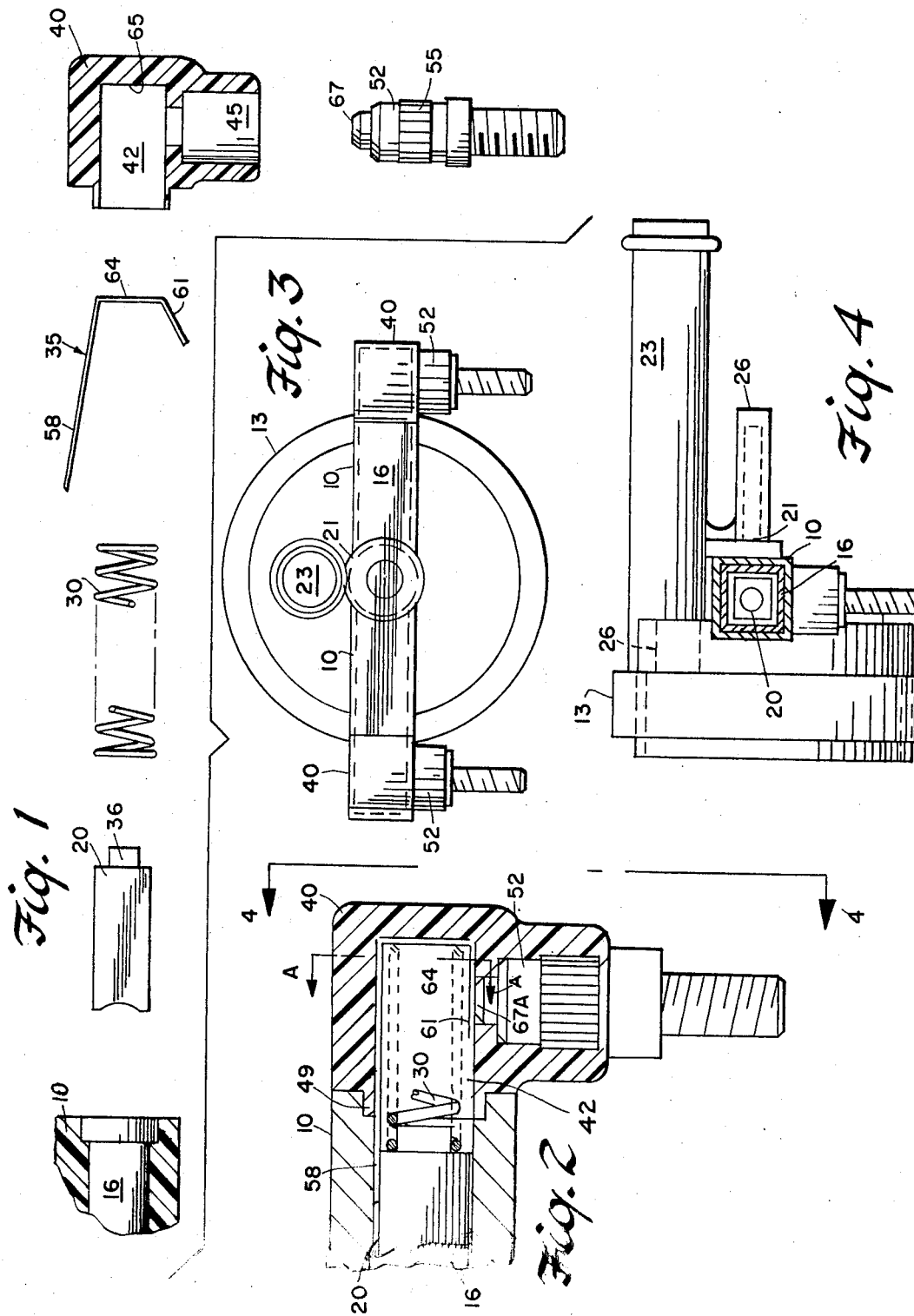

ELECTRIC PUMP COMMUTATOR BRUSH HOLDER CONSTRUCTION

Briefly, the invention contemplates a pump motor end casing comprising a molded body having integral brush holder housings and molded closure members each having a pair of bores at right angles to each other and provided with a shoulder which is securely fitted into a rabbetted edge of a respective brush holder housing. The shoulder and rabbetting aligns the closure members with the respective brush housings in each of which a commutator brush is disposed. One of the bores of each closure member contains a coil spring abutting the brush to bias it against a commutator in the motor end casing and also effects conductive electrical contact with the brush. A respective spring of flat leaf material is U-shaped, rectangularly, to encompass or bracket each coil spring within the bore in which the coil spring is socketed. The free ends of the latter springs are outwardly bent to effect good contact on the brushes and with terminal posts secured in the other bores of the closure members.

A detailed description of the invention now follows in conjunction with the appended drawing in which:

FIG. 1 is an exploded view of the essential elements of the invention at one side of a motor end casing;

FIG. 2 is an assembly view in cross section;

FIG. 3 is an end view showing the motor end casing and closure members;

FIG. 4 is a side view of FIG. 2 partially, in cross section on the section line A—A of FIG. 2.

Referring to the drawing, commutator brush housings 10 on a motor end casing 13 are shown all as an integral molding. The housings are tubular, open ended, and hollow, having square cross section bores 16. As viewed in FIG. 3, it will be understood that the commutator of the motor is concentric with the circular motor end casing 13 and that a rectangular brush, such as 20, is disposed in each housing 10, freely slidable in each housing, to engage a commutator (not shown) at their inner ends, which commutator will be understood to rotate in the circular socket 21.

The motor end also has the integrally molded pump outlet conduct 23 connecting via channel 26 for fluid passage over the motor (not shown).

Each brush 20 has a conductive biasing coil spring 30 bracketed by a conductive contact spring 35 of leaf spring material. Springs 30 are centered by the boss 36 on the respective brush and the brush maintained against the commutator by the coil spring.

A respective molded closure member 40 is provided for housing the springs at the outer ends of brush housings 10. Each closure member has interconnecting bores 42 and 45 whose axes are at right angles to each other wherein the square bore 42 is elongated by the integral square shoulder 49 cemented in the rabbetted edge of respective brush housing 10, FIG. 2. The bore 45 of each closure member is circular in cross section and receives a connector post 52 which is force fitted therein and permanently secured as by knurling 55.

Calling particular attention to FIG. 1, the contact spring 35 has an elongated arm 58 outwardly bent while its opposite arm 61 is bent likewise outwardly. The arms are joined by the base or connecting segment 64, thus forming a U-shaped bracket for respective spring 30, upon assembly, FIG. 2. The base or connecting segment 64 engages the end wall 65 of bore 42 to definitely locate it in the bore and arm 58 extends into bore 16, which is aligned with bore 42, where it contacts brush 20.

The initial divergent stress of the arms of contact spring 35 effects a snug fit in bore 42 so that the spring will remain in position during assembly. Also, the elongated arm 58 provides for alignment with respective bores 16 so that it will not interfere with the brush movement therein.

Thus, each spring 30 is socketed within a bore 42 of a closure member 40 and also socketed therein and bracketing each spring 30 is a conductive contact spring 35. It will be noted that the arms 58 and 61 have been inwardly flexed resiliently in assembly so as to form the generally rectangular bracket around the coil spring 30 longitudinally on two sides and at the outer end thereof by the connecting segment 64. Arm 58 provides a contact with the brush in addition to the contact provided by spring 30 while the forced flexing of arm 61 provides a good contact with connector terminal 52.

It will be appreciated that although the arms of spring 35 are shown as spaced from the adjacent portions of spring 30, the dimensions can be such that there is substantial continuous contact without hampering the biasing effect of spring 30. In any event, the connecting segment 64 at the outer end of each flat spring 35 is abutted by the outer end the respective coil spring 30 and accordingly there is also conductivity from brush 20 through coil spring 30, segment 64, and arm 61 to terminal post 52. It will also be appreciated that the inner tip 67 of the terminal 52 can protrude slightly into bore 42 in order to insure engagement with arm 61.

The conductive path effected directly from brush 20 to terminal 52 is important since it decreases the current that spring 30 would otherwise have to carry. This precludes undue heating and consequent loss of elasticity of spring 30, with loss of proper bias on brush 20 to maintain commutator contact.

Accordingly, springs 30 and 35 are current carriers, with spring 35 actually bypassing current around spring 30 in order to reduce the electrical load through spring 30.

Springs 35 are shown and described as resilient members and preferably would be such. However, to achieve the current bypassing effect a non-resilient member could be used. In such case, the contact tip 67 would preferably be a resilient member, such as a short compression spring.

Further, while springs 35 are preferably of the width of sockets 16 (FIG. 4) so as to aid in alignment of closure members 40 with housing members 10, this is not essential to the electrical function. Likewise, while arms 58 are bent outwardly to take up any play of shoulders 49 during cementing in the rabbetts at the end of openings 16, this feature could be omitted and arms 58 made normal to ends 64 or even bent inwardly to increase contact engagement with respective brushes 20.

What is claimed is:

1. In a commuter brush holder construction for an electric motor, a molded member (40) having interconnecting bores (42, 45); a conductive connection terminal (52) secured in one (45) of said bores and having a contact portion (67) exposed to the other (42) of said bores; a brush biasing spring (30) freely socketed in the other (42) of said bores and a U-shaped contact member (35) therein having arms (58, 61) and an end connecting segment (64) and bracketing said biasing spring and having conductive engagement therewith; one said arm (61) being disposed to engage said contact portion (67) of said connection terminal.

2. In a brush holder construction as set forth in claim 1, said arms having an initially divergent stress and being flexed into parallelism within said other bore whereby said one arm (61) has biased engagement with said contact portion (67).

3. In a brush holder construction as set forth in claim 1, said contact spring end segment being positioned by engaging an end wall of said other bore and said biasing spring having an end engaging said contact spring end segment.

4. In a brush holder construction as set forth in claim 1, said U-shaped contact member being of resilient leaf material and the other arm (58) being longer than said one arm (61) so as to extend outwardly of said closure member to effect conductive engagement with a brush to effect a current path from said brush to said terminal.

5. In a contact brush holder construction for an electric motor, a molded member (40) having a bore and a conductive connection terminal (52) exposed to said bore; a brush biasing spring (30) freely socketed in said bore and a conductive contact member (35) within said bore therein having arms (58, 61) extending longitudinally of said biasing spring; one said arm (61) engaging said connection terminal and the other (58) said arm extending outside said closure member to engage a commutator brush and effecting a current path therefrom to said terminal.

6. In a brush holder construction as set forth in claim 1, said biasing spring conductively engaging said contact member to effect a conductive path in electrical parallel therewith.

7. A commutator brush holder construction comprising a molded motor end casing (13) having integrally molded thereon a pair of spaced aligned hollow tubular commutator brush housings (10) open at both ends and a contact brush (20) freely slidable in each housing; said brushes having inner ends spaced to engage opposite sides of a commutator to be accommodated in said casing; the outer ends of said housings each being closed by a respective molded closure member (40) secured thereto; each said closure member having a spring receiving bore (42) aligned with a respective hollow interior (16) of said brush housings; and each said closure member having a conductive connector terminal (52); a brush biasing spring (30) engageable with a respective brush and socketed in each said spring receiving bore; a U-shaped contact member (35) having arms (38, 61) and a connecting end segment (64) bracketing the respective biasing spring in each said closure member (40); one (61) of said arms being electrically connected to said connection terminal and the other (58) arm being extended into a respective brush housing (10) and engaging a respective brush for effecting a conductive path between said terminal and said brush.

8. In a construction as set forth in claim 7, each said biasing spring conductively engaging a respective brush and also conductively engaging the respective contact member to effect a conductive path therewith.

9. A commutator brush holder construction comprising, a molded motor end casing (13) having integrally molded thereon a pair of spaced aligned hollow tubular commutator brush housings (10) open at both ends and a contact brush (20) freely slidable in each housing; said brushes having inner ends spaced to engage opposite sides of a commutator to be accommodated in said casing; the outer ends of said housings each being closed by a respective molded closure member (40) secured thereto; each said closure member having a spring receiving bore (42) aligned with a respective hollow interior (16) of said brush housings; and each said closure member having a conductive connector terminal (52); a brush biasing spring (30) engageable with a respective brush and socketed in each said spring receiving bore; contact member (35) for each respective biasing spring in each said closure member (40); electrically connected to said connection terminal and extended into a respective brush housing (10) and engaging a respective brush for effecting a conductive path between said terminal and said brush.

10. In a construction as set forth in claim 9, each said biasing spring conductively engaging a respective brush and also conductively engaging the respective contact member to effect a conductive path therewith.

* * * * *